US009926170B2

United States Patent
Michel et al.

(10) Patent No.: US 9,926,170 B2
(45) Date of Patent: Mar. 27, 2018

(54) MOVEMENT-MONITORING SYSTEM OF AN ELEVATOR INSTALLATION

(71) Applicant: Inventio AG, Hergiswil (CH)

(72) Inventors: David Michel, Thalwil (CH); Eric Birrer, Buchrain (CH); Rudolf J. Müller, Lucerne (CH); Michael Geisshüsler, Lucerne (CH)

(73) Assignee: INVENTIO AG, Hergiswil (CH)

( * ) Notice: Subject to any disclaimer, the term of this patent is extended or adjusted under 35 U.S.C. 154(b) by 359 days.

(21) Appl. No.: 14/439,264

(22) PCT Filed: Oct. 22, 2013

(86) PCT No.: PCT/EP2013/072062
§ 371 (c)(1),
(2) Date: Apr. 29, 2015

(87) PCT Pub. No.: WO2014/067814
PCT Pub. Date: May 8, 2014

(65) Prior Publication Data
US 2015/0307319 A1 Oct. 29, 2015

(30) Foreign Application Priority Data

Oct. 30, 2012 (EP) ..................... 12190499

(51) Int. Cl.
*B66B 3/00* (2006.01)
*B66B 1/34* (2006.01)
(Continued)

(52) U.S. Cl.
CPC .............. *B66B 1/3407* (2013.01); *B66B 5/06* (2013.01); *B66B 5/16* (2013.01); *G01D 5/142* (2013.01); *G01P 15/00* (2013.01); *G05B 15/02* (2013.01)

(58) Field of Classification Search
CPC ........... B66B 1/3407; B66B 5/06; B66B 5/16; G01D 5/142; G01P 15/00; G05B 15/02
(Continued)

(56) References Cited

U.S. PATENT DOCUMENTS

2015/0251877 A1* 9/2015 Niikawa ................... B66B 5/04
187/305
2015/0274487 A1* 10/2015 Annen ..................... B66B 5/06
700/275

FOREIGN PATENT DOCUMENTS

| CN | 1331653 A | 1/2002 |
| CN | 101353126 A | 1/2009 |

(Continued)

*Primary Examiner* — Jeffrey Donels
(74) *Attorney, Agent, or Firm* — William J. Clemens; Shumaker, Loop & Kendrick, LLP (57) ABSTRACT

In an elevator installation, an elevator car is movably arranged alongside guide rails and the elevator car is equipped with a brake system with preferably two safety brakes. A movement monitoring system monitors the movement parameters of the elevator car and triggers corresponding warnings or safety measures, if permissible threshold values are exceeded or it provides determined adjusted movement parameters to an elevator control. The movement monitoring system determines a first movement parameter in a time interval and detects an acceleration of the elevator car. The movement monitoring system determines the time interval for determining the adjusted movement parameter as a function of the detected acceleration.

14 Claims, 5 Drawing Sheets

(51) Int. Cl.
    *B66B 5/06*     (2006.01)
    *B66B 5/16*     (2006.01)
    *G01D 5/14*     (2006.01)
    *G01P 15/00*    (2006.01)
    *G05B 15/02*    (2006.01)

(58) Field of Classification Search
    USPC .......................................................... 187/393
    See application file for complete search history.

(56) References Cited

FOREIGN PATENT DOCUMENTS

| | | |
|---|---|---|
| CN | 101715426 A | 5/2010 |
| CN | 202063717 U | 12/2011 |
| CN | 102348625 A | 2/2012 |
| EP | 1412274 | 4/2004 |
| EP | 1602610 A1 | 12/2005 |
| EP | 2108609 A2 | 10/2009 |
| JP | 2009023823 A | 2/2009 |
| WO | 03011733 A1 | 2/2003 |
| WO | 2009013144 A1 | 1/2009 |
| WO | 2010107409 A1 | 9/2010 |

\* cited by examiner

MOVEMENT-MONITORING SYSTEM OF AN ELEVATOR INSTALLATION

FIELD

The invention relates to a movement-monitoring system and a method for monitoring a movement of an elevator car of an elevator installation including an elevator installation with such a movement-monitoring system.

BACKGROUND

An elevator installation is installed either inside or outside a building. It essentially consists of a car, which is connected by supporting means with a counterweight or a second car. By means of a drive, which acts selectively on the support means or directly on the car or the counterweight, the car is moved along substantially vertical guide rails. The elevator installation is used to transport persons and goods within the building over one or several floors.

The elevator installation comprises means to protect the elevator car in case of a failure of the drive, the support means or other elevator components. In order to detect such failure, the travel speed of the elevator car is usually monitored. Upon detection of a fault, usually multilevel security measures are initialized. A first security measure is, for example, a shutdown of the elevator drive, or a motor of the drive and actuation of the drive brakes in order to stop the elevator car. This is done for example by interrupting an elevator safety circuit. Another security measure involves the activation of a safety gear or appropriate safety brakes. They can decelerate the elevator car on the guide rails in case of need. Depending on the position of the elevator car or its operating mode, the travel speed is nowadays increasingly monitored by a so-called electronic limiter, which can initialize the necessary safety measures.

From the international application WO 2003/011733 is known a device which, by means of a coded absolute position-measurement system, provides secure information to a controller of an elevator. From a position change as a function of time, a resultant travel speed can be calculated. Since at the same time the position of the elevator car is known, the entire travel course can be regulated and monitored.

SUMMARY

The solutions described below allow such a measuring system, which provides data from a position measuring system or other movement measurement system, to optimize the data so that it makes possible an efficient and responsive monitoring of the movement of the elevator car.

According to one aspect of the proposed solution, the movement monitoring system for monitoring the movement of an elevator car of an elevator installation comprises a first movement detection module for determining a first adjusted parameter size in a first time interval. In addition, the movement monitoring system includes a first acceleration sensor for sensing a first acceleration of the elevator car. The first movement detection module specifies the first time interval to determine the first adjusted movement parameter of the elevator car as a function of the detected first acceleration of the elevator car.

For example, the movement monitoring system comprises a first movement sensor as part of the first movement detection module. This first movement sensor detects a travel path of the elevator car movement as a parameter thereof at a predetermined sampling rate. A first computing unit determines the travel speed from the signal of this first movement sensor at time intervals. The time interval is typically a multiple of the sampling rate. The sampling rate is a time rhythm, in which a travel information of the elevator cabin car is retrieved and evaluated. Every individual travel information is naturally subject to an error. This is caused, for example, because the travel is recorded in increments, and thus the individual travel information is inaccurate due to a measurement error. A time delay in the detection and evaluation logic causes a further delay between the time information, and changes are thus not detected, and the information relates to an average over the time interval in which the track information is evaluated. According to the solution, the movement monitoring system comprises a first acceleration sensor, and a first evaluation logic sets the first time interval to determine the first vehicle speed depending on the detected first acceleration of the elevator car. Generally speaking, therefore, to monitor the movement of the elevator car, a track or a movement parameter of the elevator car is recorded at a predetermined sampling rate, and the first adjusted movement parameter to be monitored is determined on the basis of the predetermined first time interval.

It should be noted that an error has different effects depending on the operating or travel situation of the elevator car. For example, at a low travel speed, an error of the travel information acts very dominant on the detected vehicle speed. The shorter the interval, the less accurate will be the travel parameters derived from this movement parameters. This places high demands on a control algorithm that controls a travel path of the elevator. With increasing acceleration, that means with rapid changes of speed, it is the time delay that affects more and more dominant the determined travel speed.

Based on the first acceleration detected by the acceleration sensor, to determine the first time interval of the adjusted movement parameter or the vehicle speed, the first time interval can be now adapted such that a sum of the error from the travel information and the error from the time delay can be minimized.

Preferably, the calculation algorithm is configured such that the determination of the first speed, that is the first movement parameter is always carried out with a plurality of different time intervals. The first calculated preliminary movement parameters assigned to different time intervals are cached. Based on the first acceleration of the elevator car determined by the first acceleration sensor, the optimal first time interval is set. This first preliminary movement parameter assigned to this first time interval is read out from the buffer memory and outputted as the first adjusted movement parameter. Alternatively, the movement parameters measured during a plurality of time intervals can also be cached. Based on the first acceleration of the elevator car determined by the first acceleration sensor, the optimal first time interval is set. The determined movement parameters assigned to this first time optimal interval are read from the buffer memory, used to calculate the adjusted first movement parameters and output, that is set, as first adjusted movement parameters.

With this situation-adapted definition of the time interval, the overall quality of the movement monitoring system for monitoring the movement of an elevator car can be optimized. With the caching of the first preliminary movement parameters, depending on the first acceleration determined by the first acceleration sensor, the first preliminary movement parameter(s) corresponding to the optimal first time interval can be calculated and output. Therefore, a further calculation or recording cycle need not be waited for, because the first adjusted movement parameter can be directly retrieved or calculated. Thus, a safety assessment can be performed quickly and promptly.

The idealized error in the travel speed resulting from the travel information is then the result of twice the size of the measurement error divided by the time interval. It is apparent that the resulting error for a small time interval is large because the measurement error of the travel information is constant due to the system. The error resulting from the time delay is calculated approximately by multiplying the acceleration by one half of the time interval. It follows that the resulting error changes as a function of the product of the acceleration and the time interval. Optimally, the time interval is therefore chosen such that the sum of the error becomes minimum.

Assuming a measurement error of 0.5 mm, for lower acceleration this results in an optimum time interval of about 40 milliseconds, while the optimal time interval for an established acceleration of 1 g (gravitational acceleration) is in the range of 10 milliseconds. These values are of course dependent on the actual measurement error. Thus, the first movement detection module preferably shortens the time interval with increasing acceleration, and it prolongs the time interval with decreasing acceleration. In an ideal observation, the optimal time interval is an interval, at which an error of the travel information is equal to the error of the time delay.

Preferably, the first adjusted movement parameter detected by the movement detection module is a first speed, a first travel track or a first position of the elevator car, and the movement detection module uses for this purpose at least one sensor for sensing the first travel speed, the first travel track and the first position of the elevator car in the elevator shaft. If need be, more adjusted movement parameters can of course be calculated based on the detected movement parameter. As previously explained as an example, the movement detection module detects the track and, based on this movement parameter, determines the travel speed. Other designs for example detect the position of the elevator car in the elevator shaft and, based on this movement parameter, determine the track and the speed. The choice of the optimal design results from the availability or selection of sensors for detecting the movement parameter of the elevator car.

Preferably, the movement monitoring system comprises a second movement detection module for determining a second adjusted movement parameter in a second time interval. Said second movement detection module in this case sets the second time interval to determine the adjusted movement parameter of the elevator car as a function of the first acceleration detected by the first acceleration sensor of the elevator car. Alternatively, the second movement detection module can take over directly the first time interval provided by the first movement detection module and use it as the second time interval. Alternatively, of course, the second movement detection module can set the second time interval to determine a second adjusted movement parameter of the elevator car as a function of a second acceleration of the elevator car detected by a second acceleration sensor. With this design, the movement of the elevator car is detected twice with independent modules, and possibly also independent sensors. A failure or a fault of a module or a sensor can thus be determined. Thus the security of the device for monitoring the movement of the elevator car is improved.

Preferably, in order to monitor the movement of the elevator car, the movement monitoring system forwards the determined first and second adjusted movement parameter, for example, the first or second traveling speed, and the first or second position of the elevator car in the elevator shaft, to a control system of the elevator installation. The elevator control system comprises a travel controller that controls the travel of the elevator system so as to follow a specified travel profile. Alternatively or additionally, the movement monitoring system further compares the determined first and second adjusted movement parameters, for example the first or second traveling speeds, with a speed limit and if the speed is exceeded, it releases a security measure. The speed limit is provided, for example, in a travel curve computer. The travel curve calculator determines a first limit speed, and possibly second or further limit speeds, permissible for a corresponding position of the elevator car in the shaft. If this speed is exceeded, such level-appropriate safety measure is triggered. Alternatively, the limit speeds can be specified as fixed values. Here, the movement monitoring system is for example set to these fixed values by the supplier.

In a preferred embodiment, the one or more sensors of the movement detection module detects an absolute position of the elevator car in the elevator shaft. Such absolute positioning system is operating, for example, with sensors that receive a magnetic, an optical, an acoustic or an electric signal, and cooperates with correspondingly configured signal generators, signal carriers and/or signal reflectors. A magnetic system works, for example, with a magnetic tape which is arranged in an elevator shaft and which has a magnetic coding. Based on the coding, positions can be learned, saved and then detected. The travel information for the determination of appropriate movement parameters is then obtained from the difference between successive absolute positions. An optical system works for example with lasers, which detect a distance to a reference point, or it uses image patterns, which are detected by an image sensor. Analogously, as in the case of the magnetic coding, here is a picture coding used, where the image information can be specially arranged images, such as a bar code, or a random, arbitrary image structure may be used. The travel information, or the movement parameter, can also be determined by comparing successive images. Here, the image sequence is selected overlapping. Thus, a local displacement of any marker or a picture pattern between two or more images can be measured and a differential travel can be determined accordingly.

An acoustic system uses, for example, an ultrasonic sensor for determining a distance to a reference point, or an electrical system operates by means of position switches or detects a distance-dependent resistance in a measuring wire.

Thus a secure and control-technologically optimized system for monitoring the movement of the elevator system can be implemented by means of known measuring methods.

In an advantageous embodiment, the components of the movement monitoring system are divided into two functional groups or functional units, which in essence operate autonomously. A first functional unit comprises, for example, the first motion detection module with the sensor, processor, comparators, etc., and the first acceleration sensor. A second functional unit is accordingly formed by the second movement detection module, naturally with the required sensor, processor, comparators, etc., and the second acceleration sensor. The comparators of the respective motion detection module or the relevant function group compare the corresponding signals, such as the first and second cabin car positions, the first and second travelling speeds, etc., of the other functional unit with the corresponding signals of its own functional unit, and they give a warning signal, when a relevant deviation is detected.

Alternatively, the comparator is arranged in the movement control system independently of the first or second functional units. In this design, it compares signals and/or intermediate results of the first and the second functional units with one another and gives the warning signal, if relevant differences between the two functional units are established.

As a whole, such redundant designs provide a complete redundant device for detecting a travel path of the elevator car and the monitoring of movements of the elevator car. This movement control system is very safe and can be used, for example, as a safe alternative to a conventional mechanical overspeed governor.

Preferably, the motion monitoring system comprises an event or data storage. In this event or data memory, for example, special events are held and identified, and adjusted movement parameters that led to this event are stored. Adjusted movement parameters are generally saved over a predetermined period of time. This allows to trace errors, or systematic differences, for example, between the motion detection modules can be detected and eliminated accordingly. Service messages are generated if systematic differences between the individual movement detection modules are detected. Systematic differences are, for example, constant absolute or relative differences.

The output of a warning signal causes in an embodiment of the proposed solution stopping the elevator car. Here, a current travel command or a pending travel cycle is properly finished and subsequently the elevator car is stopped by switching off the motor and actuating the elevator brake. This allows overall a safer, more efficient and more comfortable operation of the elevator. An internal error of the movement monitoring system can thus be detected by the movement monitoring system for detecting a travel path of the elevator car itself, and the elevator system can be repaired by a service technician. By the proper closing of a possibly upcoming move command, a confinement of persons in a suddenly stationary elevator car is prevented.

Preferably, the triggering of the safety measure effects in a first stage an interruption of a safety circuit so that the elevator car is stopped by a normal operation equipment. The safety circuit monitors safety-related functions of the elevator. An interruption of the safety circuit typically results in an immediate shutdown of the elevator drive and an actuation of the brake actuator. In a second stage, the triggering of the safety measure causes an activation of an emergency braking device, whereby the elevator car stops even if the normal operation means fail. The emergency braking device can be for example a safety device which is capable of braking the elevator car on the guide rails even if the support means fail. In an optimal arrangement, the movement monitoring system is designed to monitor the movement of the elevator car in order to be able in the event of an unexpected increase in the travel speed to initialize a number of subsequent security measures one after another. Subsequent in this context means, for example, that if a first threshold value is exceeded, a first security measure is immediately triggered and the drive control reduces the travel speed and stops the car in the next floor. If a second limit value is exceeded, as a second safety measure, the previously mentioned safety circuit, steps in and the driving brake is immediately activated, which leads to an immediate stopping of the elevator car. If now in spite of all measures, a further speed limit is exceeded, as a further security measure, the safety gear is directly actuated and the elevator car is clamped by the catcher on the guide rails.

Preferably, the movement monitoring system for monitoring the movement of the elevator car further comprises a crash monitoring device. This device monitors the signals of the acceleration sensors, namely the first and possibly the second acceleration sensors. It directly activates the emergency brake or an appropriate safety gear when the first or the second acceleration of the elevator car exceeds a predetermined acceleration value over a time range. This allows, for example, a quick detection of the tearing of a car suspension, because then the acceleration of the elevator car increases to a free-fall value. Thus, before any critical speed is reached, the elevator car can be captured and clamped in the guide rails.

DESCRIPTION OF THE DRAWINGS

In the following text, exemplary embodiments are described with reference to examples and schematic embodiments. In the drawings.

In the figures, the same reference numerals are used for similarly acting parts throughout.

DETAILED DESCRIPTION

Figure 1:
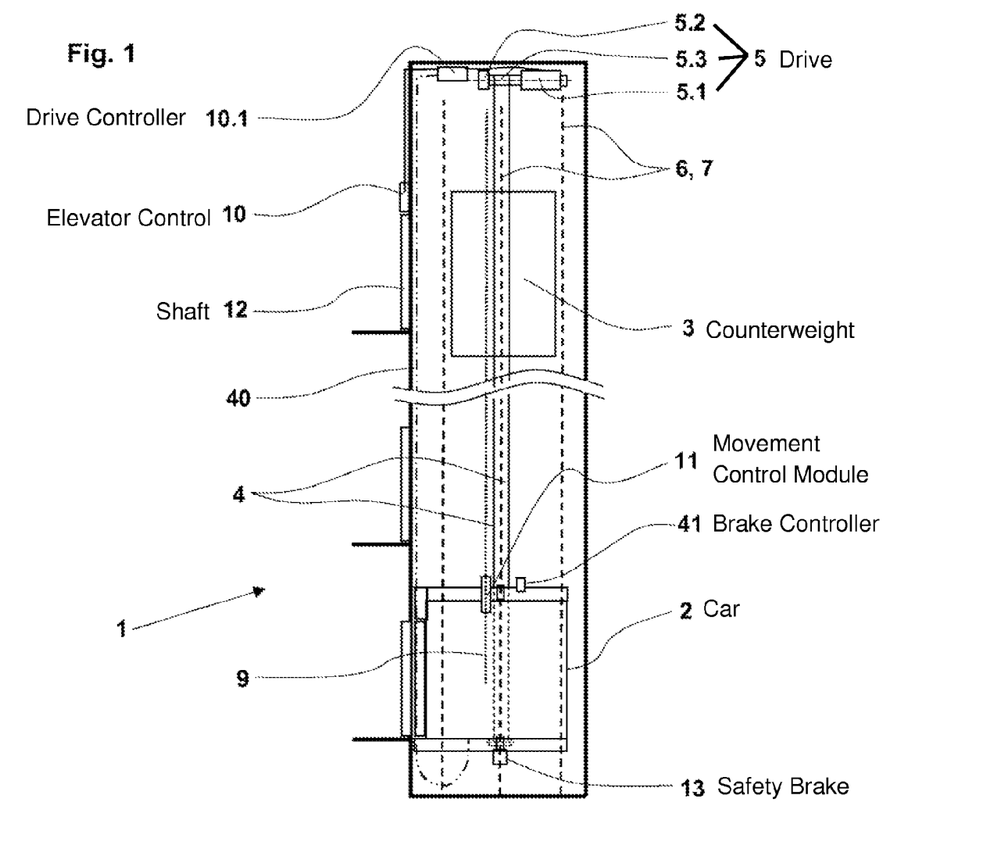
FIG. 1 shows a schematic view of an elevator installation in the side view.

FIG. 1 shows an elevator installation 1 in a schematic view. The elevator installation 1 is installed in a building and it serves for the transport of persons or goods within the building. The elevator system includes an elevator car 2, which can move up and down along guide rails 6. A drive 5 is used for driving and holding the elevator car 2. Drive 5 is arranged for example in the top part of the building and the car 2 hangs with supporting means 4, such as support cables or straps, on the drive 5. The drive usually consists of a driving zone 5.3 for driving the support means 4, a motor 5.1 for driving the driving zone 5.3 and a drive brake 5.2 for holding the drive in an idle state. The support means 4 are led via the drive 5 and the drive zone 5.3 to a counterweight 3. The counterweight 3 compensates for a fraction of the mass of the elevator car 2 so that the drive 5 must only compensate for an imbalance between the car 2 and the counterweight 3. In the example, the drive 5 is arranged in the upper region of the building. It could of course be arranged at another place in the building or in the car 2 or the counterweight 3. Other types of the drive are also possible. Thus, the drive brake 5.2 can also be arranged isolated from the drive means 5 on the car 2, or the drive 5 can drive directly the car 2.

The elevator installation 1 is controlled by an elevator control 10. The elevator control 10 receives user requests, optimizes the operation of the elevator installation and controls the drive 5, usually via a drive controller 10.1. The drive controller 10.1 can be assembled with the elevator control 10, but it can also be arranged separately from the elevator control. The elevator controller 10 also monitors a security status of the elevator system, interrupts the driving operation, if an unsafe condition occurs. This monitoring is performed usually with the use of a safety circuit 40, in which are integrated all relevant functions.

The elevator car 2 and, if necessary, also the counterweight 3 are further equipped with a braking system which is suitable to secure and/or delay the elevator car 2 in the event of an unexpected movement or an excessive speed. The brake system comprises safety brakes or stop devices 13 which are mounted on the travel bodies 2, 3. The safety brakes 13 are arranged in this example beneath the car 2 and are controlled electrically by means of a brake controller 41. The signals required for the control can be sent by wire signal lines or they can of course also be transmitted wirelessly. The brake controller 41 is connected to a movement control module 11, which monitors the movements of the elevator car 2. The movement monitoring module 11 detects and identifies relevant movement parameters of the elevator car and provides these parameters to the elevator control 10 or triggers any required security measures. In the example, the movement control module 11 cooperates with a signal band 9, which enables detection of the position of the elevator cabin car in the elevator shaft 12 and, if necessary, the motion control module 11 initializes the safety measures. A mechanical speed limiter, as it is commonly used, is unnecessary.

Figure 2:
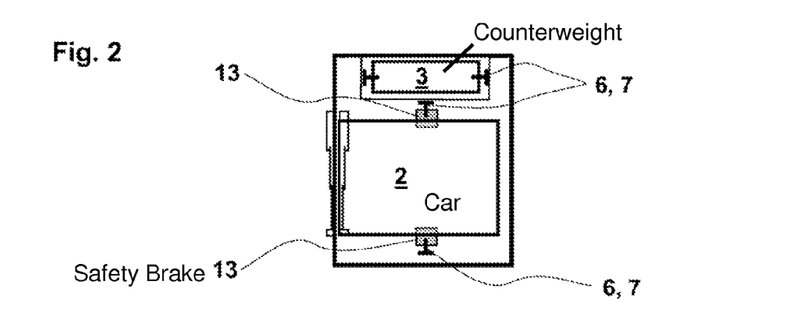
FIG. 2 shows a schematic view of the elevator system in cross-section.

FIG. 2 shows the elevator installation of FIG. 1 in a schematic plan view. The braking system comprises two safety brakes 13. The two safety brakes 13 are preferably designed identical in construction or mirror symmetry and they act on the brake rails 7 arranged on both sides of the car 2. The brake rails 7 are in the example identical to the guide rails 6.

Figure 3:
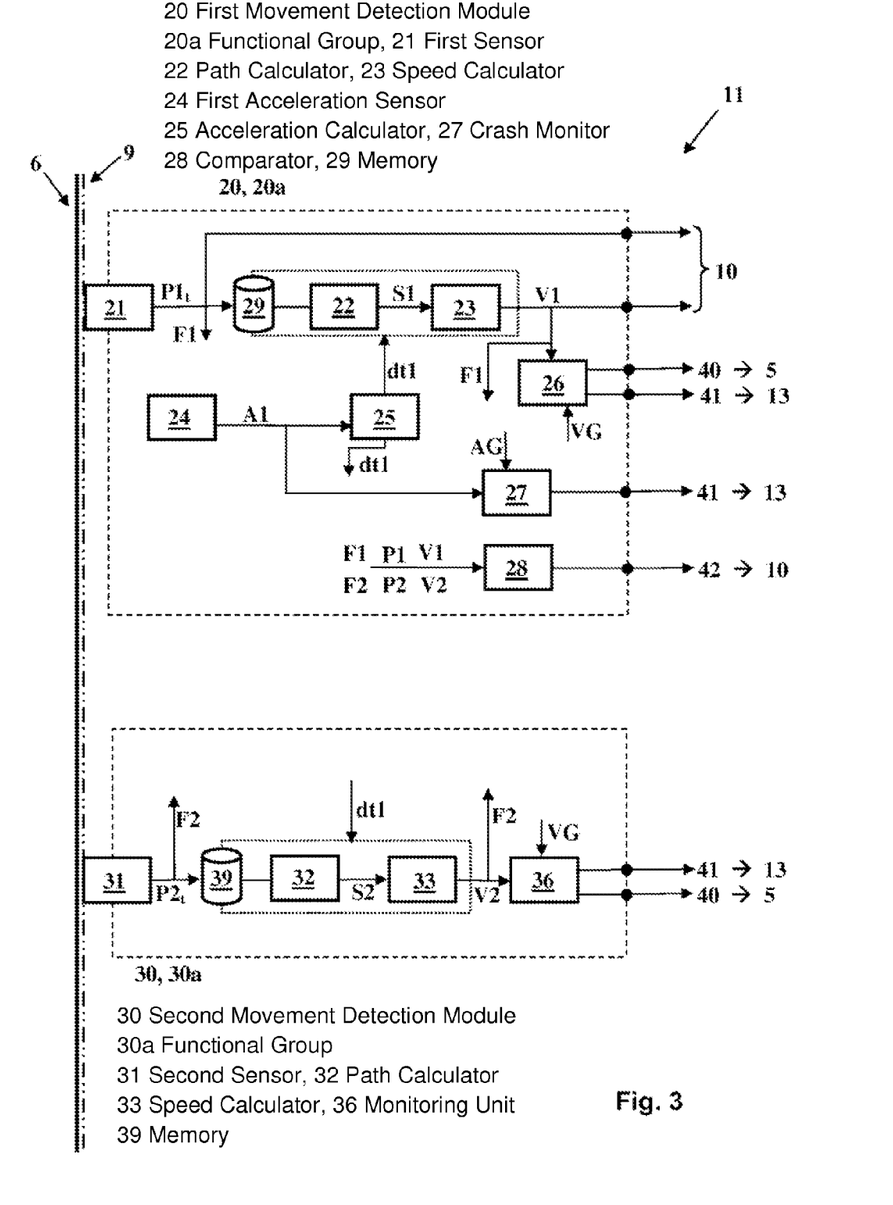
FIG. 3 shows a first example of a movement control system.

In the exemplary embodiment of FIG. 3, the movement monitoring module 11 consists of a first movement detection module 20 and a second movement detection module 30, and the movement monitoring control module 11 is accordingly performed redundantly in important functions. Two movement modules 20, 30 comprise a first and a second sensors 21, 31 which in this example cooperate with a signal band or carrier 9. The signal carrier 9 is mounted on a guide rail 6, and in this embodiment it comprises a magnetic coding. This magnetic coding contains a plurality of code markers arranged in a row, which are magnetized as south pole or north pole. Several successive code markers form a code word. The code words are in turn arranged in a row as a code marker pattern with binary pseudo-random coding. Each code word represents an absolute car position in the shaft. An accuracy ds of the position detection of such a system is for example about 0.5 millimeters.

Figure 4:
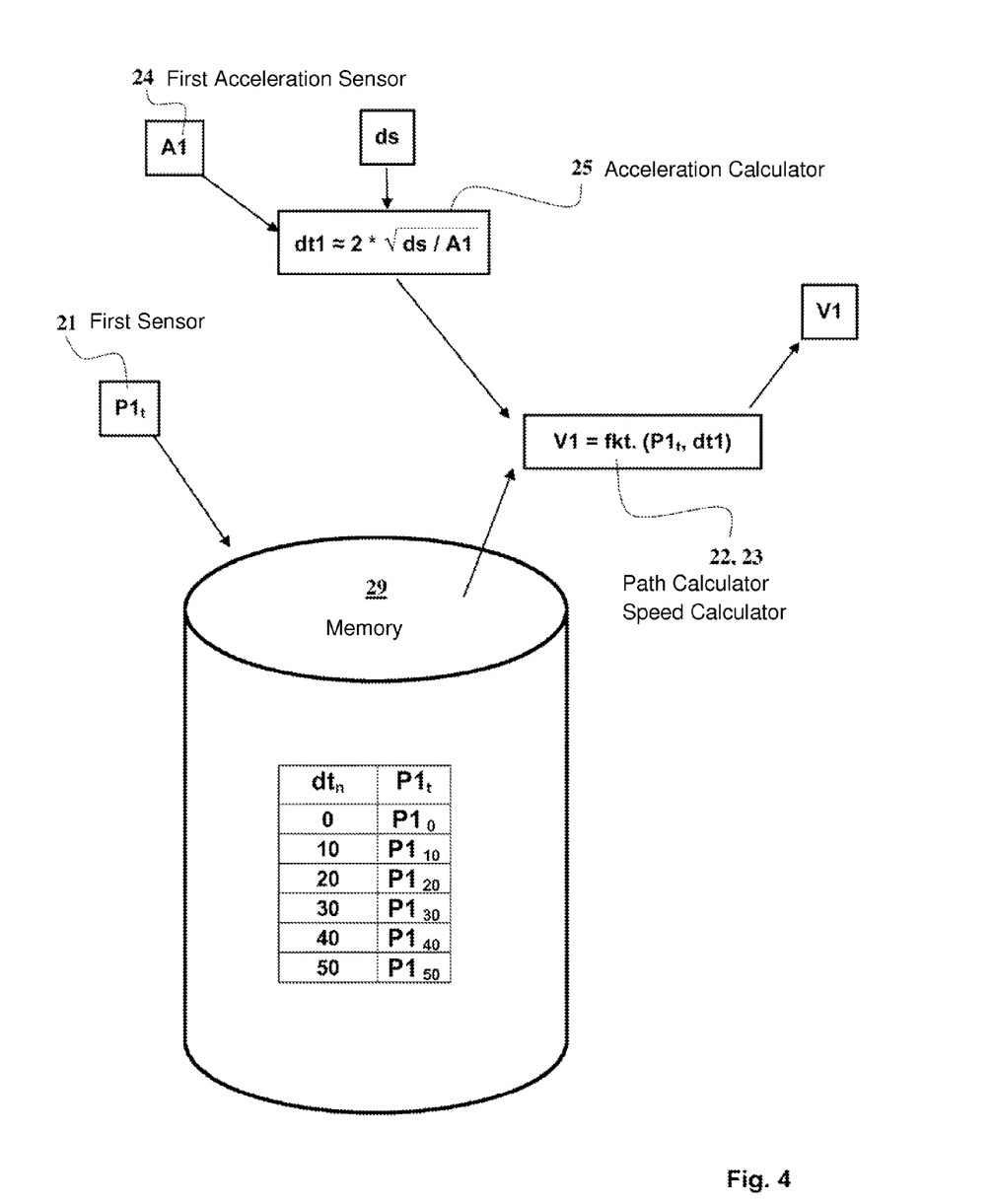
FIG. 4 shows a memory concept for the movement monitoring system of FIG. 3.

Said first motion detection module 20 thus comprises the first sensor 21 or a group of individual sensors, preferably Hall-effect elements, with associated evaluation logic and memories. The first sensor 21 detects the code markers and determines the current first car position $P1_t$ at short intervals $dt_n$, or with an appropriate sampling rate. Such interval is, for example, 10 milliseconds. In the example, the thus acquired car positions $P1_t$ are, on the one hand, forwarded directly to the elevator control 10 as a first adjusted car position P1, and on the other hand, are saved in a memory 29. As schematically shown in FIG. 4, the current car position $P1_{t=10}$ as well as several previous car positions $P1_{t=-10}$, $P1_{t=-20}$, $P1_t$ are saved in the memory 29.

The first movement detection module 20 further comprises a first accelerator sensor 24, which detects a current first acceleration A1 of the elevator car. Based on the system-induced accuracy ds, an acceleration calculator 25 determines the position and the current first acceleration A1, an optimal first time interval dt1 for the determination of a first adjusted parameter S1, V1 of the elevator car. On the basis of the optimum first time interval dt1, a path calculator 22 and a speed calculator 23 now caliper the corresponding previous car positions $P1_t$, and determine the first adjusted movement parameters S1, V1. In principle, the path calculator 22 determines from the subsequent cabin car positions $P1_{t=0}$, $P1_{t=10}$, $P1_{t=20}$, ... $P1_t$ path increments or a distance covered S1 and a speed calculator 23 determines from the distance covered S1 or the travel distance increments a first travel speed V1. In the example, the path and speed calculators 22, 23 are consolidated and they determine directly from the subsequent car positions $P1_{t=0}$, $P1_{t=10}$, $P1_{t=20}$, ... $P1_t$ the first adjusted movement parameter V1. The thus determined first adjusted movement parameter V1 is now provided also to the elevator controller 10 for control and regulation of the elevator. The analysis of the above data takes place in time intervals corresponding to the first time interval dt1.

A typical maximum first time interval dt, which is used to determine the adjusted first movement parameters V1 is, with a position detection accuracy of about 0.5 millimeters, of the order of 30 to 50 milliseconds. The caching in the memory 29 accordingly comprises at least the car positions corresponding to the maximum time interval. With increasing acceleration, this time interval can be reduced to up to 10 milliseconds. Accordingly, a temporal error can be reduced to about 5 milliseconds. Particularly useful is such a reduction of the time interval during acceleration ranges above about 0.5 g (half the acceleration due to gravity), because such accelerations do not occur in normal operation and such accelerations quickly lead to high speeds.

In addition, the first movement detection module 20 according to FIG. 3 comprises an optional monitoring unit 26 which compares the first adjusted speed V1 with one or more limit speeds VG. Upon determining that these thresholds have been exceeded, the safety circuit 40 is interrupted and so the drive 5 is stopped or a safety brake 13 is actuated, for example, by a brake controller 41.

In the further embodiment according to the present example, the first movement detection module 20 further comprises a crash monitor 27. The crash monitor 27 compares the first acceleration A1 with an acceleration limit AG and actuates, if necessary, the safety brake 13 by means of the braking control 41.

In addition, the present movement control module 11 according to FIG. 3 comprises the second movement detection module 30, which for the improvement of the reliability of the system comprises a second sensor 31 which is redundant to the first sensor 21. Analogously to the first movement detection module 20, the second sensor 31 detects the code markers of the signal carrier 9 and determines a current second car position P2, which in principle should correspond to the first car position P1. A path calculator 32 determines from each subsequent second car positions the movement increments or a covered second path S2, and a second speed calculator 33 determines from the covered second path S2 a second travel speed V2. The operation to capture and temporary save the car positions corresponds to the previous explanation of the first movement detection module 20. The second movement detection module 30 refers, in the present embodiment, to the first time interval dt1 to detect or determine the adjusted second movement parameter P2, S2, V2 from the first movement module 20. Furthermore, the second movement detection module 30 also comprises a monitoring unit 36, which compares the second travel speed V2 with one or a plurality of limit speeds VG. When the system determines that these thresholds or the limit speeds VG have been exceeded, the safety circuit 40 is interrupted and so drive 5 is stopped or the safety brake 13 is actuated by the brake controller 41.

In addition, the first movement module 20 receives from the second movement detection module 30 adjusted movement parameters P2, V2, and compares in a comparator 28 the corresponding values with the first adjusted movement parameters P1, V1 of the first movement module 20. If the comparison of the adjusted movement parameters P1/P2, V1/V2 is a match, an ok status is issued. If the comparison of the adjusted movement parameters is not a match, the elevator drive is stopped, for example, by interrupting the safety circuit 40 or by an appropriate warning level signal 42, which is sent to the elevator or drive controller 10, 10.1.

The two movement modules 20, 30 are preferably arranged in a common housing and can be arranged as a unit on the elevator car 2 and aligned to the signal carrier 9. Of course, the individual computers 22, 23, 25, comparator 28 and control units 26, 27 and the acceleration sensor 24 can also be assembled together with the sensor 21 on common printed circuit boards, or the processing functions can be combined in the common processors. To improve safety and implement redundant units, in the present example, the two movement modules 20, 30 are designed with redundant sensors 21, 31 for detecting adjusted parameters and with redundant processors for evaluating the sensor signals. In this case, the second movement module 30 uses the first time interval dt1 detected by the first movement module 20. The first time interval dt1 thus also corresponds to the second time interval dt2.

Figure 5:
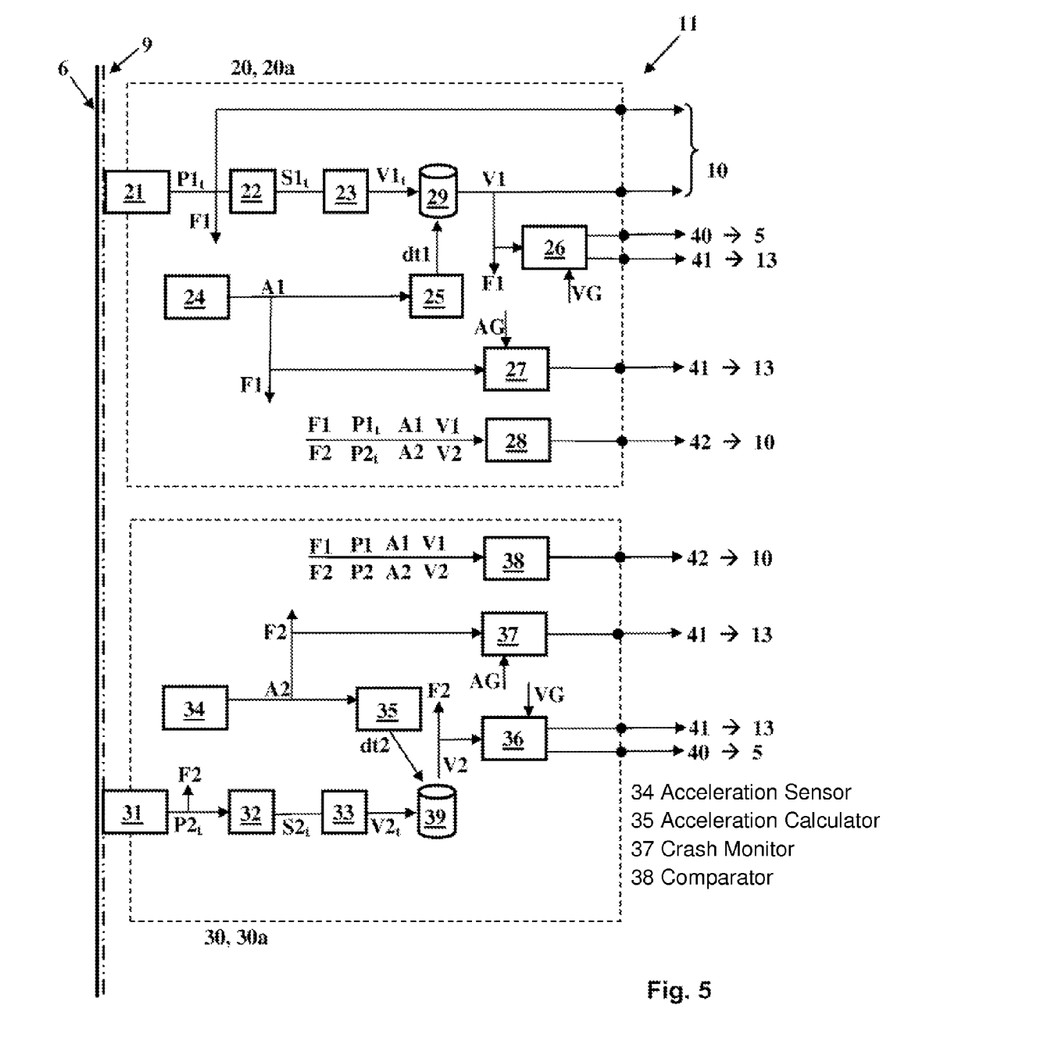
FIG. 5 shows a second example of a movement monitoring system.
Figure 6:
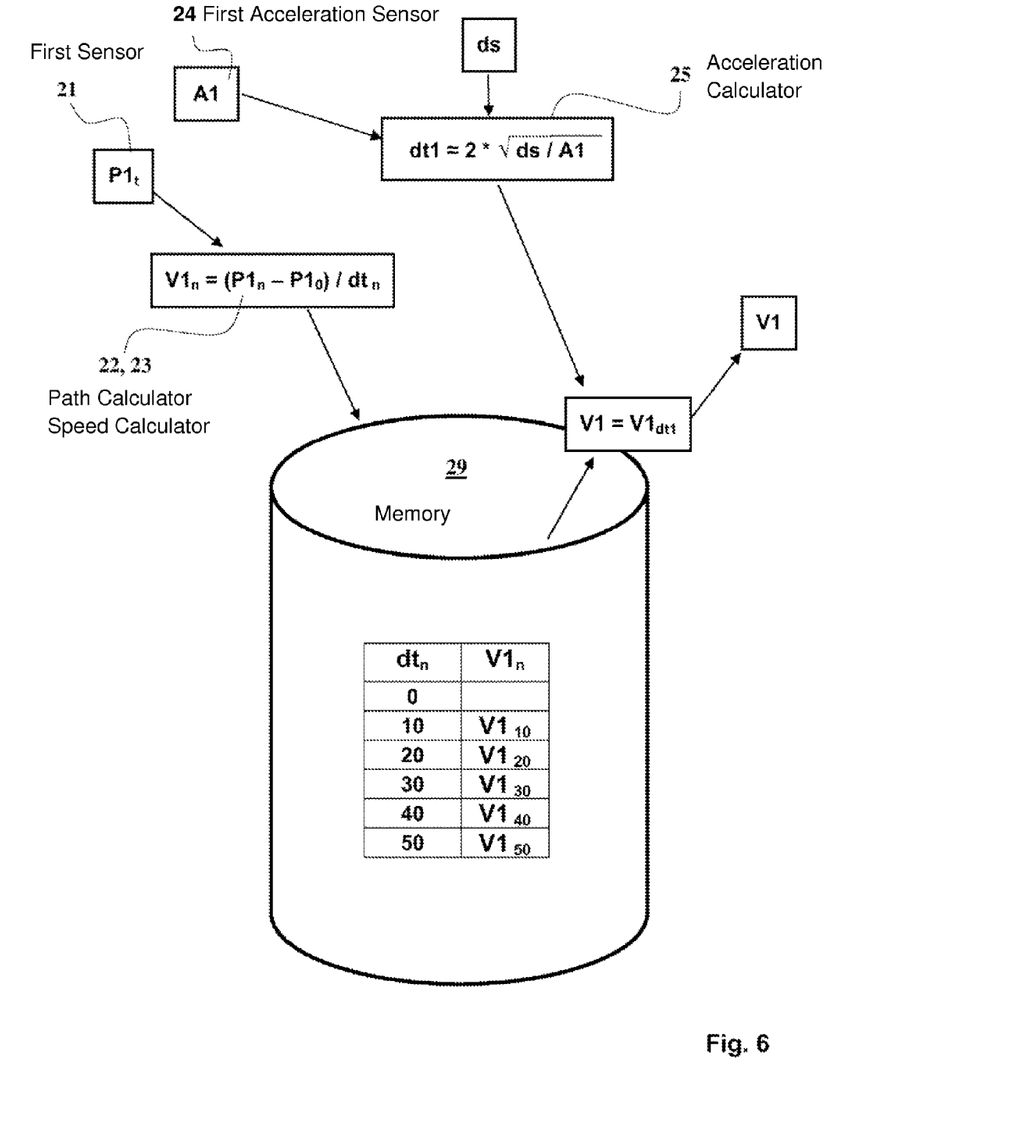
FIG. 6 shows a storage concept for the movement monitoring system of FIG. 5.

A further developed embodiment, as shown in FIG. 5, is designed with a different caching and extended redundancy. The movement monitoring module 11 in turn consists of a first movement detection module 20 and a second movement detection module 30. The first movement detection module 20 essentially corresponds to the embodiment, as was explained in connection with FIG. 3. Again, the first car positions $P1_t$ detected in the short intervals $dt_n$ or with an appropriate sampling rate are sent as the current first adjusted cabin car positions P1 directly to the elevator control 10. In contrast to the embodiment of FIG. 3, however, for each short interval $dt_n$ are calculated the associated first preliminary movement parameters, or in the example, the preliminary travel speeds $V1\_{t=-10}$, $V1\_{t=-20}$, $V1\_t$ and, as shown in FIG. 6, cached in memory 29, Thus, in the intermediate memory 29 are saved the first preliminary travel speeds $V1\_{t=-10}$, $V1\_{t=-20}$, $V1\_t$ that are assigned to the possible time intervals dt. These values in the buffer memory 29 will of course be overwritten with each subsequent position.

Similar to the embodiment of FIG. 3, the acceleration calculator 25 determines on the basis of systemic accuracy ds the position detection and the current first acceleration A1, the optimal time interval dt in order to determine the adjusted first movement parameter S1, V1 of the elevator car. The motion detection module 20 retrieves the first preliminary movement parameter, or the first preliminary driving speed $V1\_n$ assigned to the corresponding optimal time interval from the memory 29, and outputs this directly as the first adjusted movement parameter to the elevator control 10. Next, of course, the movement monitoring module 11 according to the embodiment of FIG. 5 also comprises the monitoring unit 26, which compares the first adjusted travel speed V1 with one or more limit speeds VG and which, if the above thresholds or these limit speeds VG are exceeded, interrupts the safety circuit 40 and thus shuts down the drive 5 or actuates the safety brake 13 by a brake controller 41. In this embodiment the first movement detection module 20 also comprises the crash monitor 27, which compares the measured first acceleration A1 with an acceleration limit AG and actuates the safety brake 13 by means of the brake controller 41.

In a further contrast to the embodiment of FIG. 3, the second movement detection module 30 of the embodiment of FIG. 5 is essentially a complete copy of the first movement module 20.

The two movement modules 20, 30 thus comprise at least one of the sensors 21, 31, which cooperate with the signal carrier 9 and which independently determine the actual preliminary car positions P1, P2. Path calculators 22, 32 determine from each succeeding car position distance increments or traveled paths S1, S2 and independent speed calculators 23, 33 determine from the travel path information S1, S2 corresponding speeds V1, V2, and save these results in the respective memories 29, 39. The detection of the above data is done in short time intervals, and the finding or determination of the first and second adjusted movement parameters is done in optimal time intervals dt.

In order to determine the optimal time interval dt, the two movement modules 20, 30 comprise acceleration sensors 24, 34, which detect the current first and second accelerations A1, A2 of the elevator car. As a function of the measured first and second accelerations A1, A2 and systemic accuracy ds of the position detection, the acceleration calculators 25, 35 define the optimal first and second time intervals dt1, dt2 to determine the adjusted movement parameters.

Both movement detection modules 20, 30 further comprise control units 26, 36, which compare the first and second speeds V1, V2 with one or more limit speeds VG. If these thresholds, that is the limit speeds VG, are exceeded, the modules 20, 30, independently of one another, interrupt the safety circuit 40 and thus the drive 5 is stopped, or, again independently of one another, the safety brake 13 is actuated by the brake control 41. Thus the security is greatly increased because two separate systems detect, evaluate and assess speed limits and the necessary measures are activated equally separately.

According to the present example, the two movement detection modules 20, 30 further also comprise respective crash monitor 27, 37, wherein said measured first and second accelerations A1, A2 are compared with an acceleration limit value AG and upon detection of a too high acceleration value (A1 or A2 greater than AG), the brake controller 41 directly actuates the safety brake 13.

For internal checking, both movement modules 20, 30 comprise a comparator 28, 38, which compares a first signal F1 of the first movement module 20 with a second signal F2 of the second movement module 30. The first comparator 28 of the first movement module 20 compares the second signals F2 detected by the second movement detection module 30 as the second movement parameters P2, V2, and the second acceleration A2 with the corresponding first signals F1, as well as the first movement parameters P1, V1 and the first acceleration A1. The second comparator 38 of the second movement module 30 compares the first signals F1 detected by the first movement detection module 20 with the corresponding own second signals F2. Both comparators 28, 38 generate a warning level signal 42 when a relevant deviation between the corresponding first and second signals F1, F2, and the values of P1/P2, S1/S2, V1/V2, A1/A2 is detected. The comparison can also include intermediate results, such as the time intervals dt1, dt2 or the calculated movement increments, etc. Based on the warning level signal 42, in the example the elevator controller 10 is instructed to complete the current drive and then shut down the elevator. Furthermore, since both movement modules 20, 30 may possibly trigger the required safety measures, security is still provided, because a simultaneous failure of both movement modules is unlikely.

The two movement modules 20, 30 are designed as their own functional groups 20a, 30a. This means that the functional groups 20a, 30a basically operate autonomously, for example, have their own energy reserves and can be tested for example in the production independently of each other.

One of the two movement modules 20, 30, or one of the two functional groups 20a, 30a, is designated as the master. In the present example, it is the movement module 20. The movement module 20 provides the determined first movement parameters P1, V1 to the elevator control to control the operation.

Variations of the embodiments are possible. Thus the signal carrier 9 can of course be divided into two redundant signal carriers. The function groups 20a, 30a according to FIG. 5 can be divided, analogously to the design of FIG. 3, into redundant processors and modules. They can also be assembled to form one functional group. Instead of the magnetically encoded signal carrier, other systems, such as an ultrasound-based distance measuring system, an image recognition system or a position measuring system with incremental encoder, etc. can be used. Different detection systems can also be combined. The first movement module 20 can operate with a magnetic code and the second movement module 30 can operate on the basis of ultrasound. The memory and calculation architecture of the embodiments in individual figures are interchangeable.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A movement monitoring system for monitoring a movement of an elevator car in an elevator shaft of an elevator installation comprising:
   a first movement detection module; and
   a first acceleration sensor for detecting a first acceleration of the elevator car, wherein the first movement detection module sets a first time interval as a function of the detected first acceleration of the elevator car;
   wherein the first movement detection module determines a first adjusted movement parameter of the elevator car in the first time interval and provides the first adjusted movement parameter to an elevator control for controlling movement of the elevator car.

2. The movement monitoring system according to claim 1 wherein the first movement detection module determines a first preliminary movement parameter in different time intervals, saves the first preliminary movement parameter determined at the different time intervals in a memory and for determining the first adjusted movement parameter determines the first time interval as a function of the detected first acceleration, reads the saved first preliminary movement parameter that corresponds to the first time interval from the memory, and defines the read first preliminary movement parameter as the first adjusted movement parameter, or reads the first preliminary motion parameter that corresponds to the first time interval from the memory and calculates the first adjusted movement parameter from the read first preliminary movement parameter.

3. The movement monitoring system according to claim 1 including a second movement detection module for determining a second adjusted movement parameter of the elevator car in a second time interval, wherein the second movement detection module determines the second time interval as a function of the detected first acceleration, or determines the second time interval as equal to the first time interval, or determines the second time interval as a function of a second acceleration of the elevator car detected by a second acceleration sensor.

4. The movement monitoring system according to claim 3 wherein the first and second adjusted movement parameters determined by the first and second movement detection modules are respectively at least one of first and second travel speeds of the elevator car, first and second paths of the elevator car, and first and second positions of the elevator car in the elevator shaft, and the first and second movement detection modules each include at least one sensor for detecting the travel speed, the path or the position of the elevator car as required.

5. The movement monitoring system according to claim 4 wherein the first and second sensors for detecting the first and second positions of the elevator car in the shaft each receive a magnetic, an optical, an acoustic or an electrical signal and the first or second sensors for detecting the first and second positions cooperate with correspondingly configured signal generators, signal carriers or signal reflectors.

6. The movement monitoring system according to claim 3 wherein the movement monitoring system at least one of passes on at least one of the first and second adjusted movement parameters to the elevator control and compares at least one of the first and second adjusted movement parameters with at least one threshold value and, if the threshold value is exceeded, triggers a security or safety measure for the elevator installation.

7. The movement monitoring system according to claim 3 wherein the first movement detection module and the first acceleration sensor form a first functional group, the second movement detection module and the second acceleration sensor form a second functional group and the movement detection system compares at least a first signal detected or determined by the first movement detection module in the first functional group as the first adjusted movement parameter, the first acceleration or an intermediate result of the first movement detection module with a second signal that was detected or determined by the second movement detection module in the second functional group, which second signal is of a same type as the first signal, as the second adjusted movement parameter, the second acceleration or an intermediate result of the second movement detection module, and the movement monitoring system issues a warning level signal if differences between the first signal and the second signal are found.

8. The movement monitoring system according to claim 7 wherein the first and the second functional groups each compare the first and second signals of the other functional group with the second and first signals of the same type with those of its own functional group and both functional groups issue the warning level signal if a difference is found.

9. The movement monitoring system according to claim 7 wherein the issuance of the warning level signal causes the elevator car to stop after a current travel command or impending travel course has been properly completed.

10. The movement monitoring system according to claim 6 wherein the safety measure causes at least one of an interruption of a safety circuit of the elevator installation and accordingly a stopping of the elevator car by a normal operation and an activation of an emergency brake whereby the elevator car stops in case of a failure of the stopping by the normal operation.

11. The movement monitoring system according to claim 3 wherein the movement monitoring system activates an emergency brake device for the elevator car if the first or second acceleration value detected by the first or second acceleration sensor respectively exceeds an acceleration value.

12. An elevator installation with an elevator car for the transport of persons or goods in an elevator shaft, wherein to monitor the movement of the elevator car, the elevator installation includes a movement monitoring system according to claim 1.

13. A method of monitoring movement of an elevator car in an elevator shaft comprising the steps of:
- detecting a first acceleration of the elevator car;
- determining a first time interval as a function of the detected first acceleration or travel information of the elevator car;
- determining a first adjusted movement parameter in the first time interval; and
- providing the first adjusted movement parameter to an elevator control for controlling movement of the elevator car.

14. The method for monitoring the movement the elevator car according to claim 13 including:
- determining a first preliminary movement parameter at different time intervals;
- saving the first preliminary movement parameter at different time intervals;
- to determine the first adjusted movement parameters, determining the first time interval as a function of the detected acceleration; and
- determining as the first adjusted movement parameter the first preliminary movement parameter corresponding to the first time interval, or
- calculating and determining the first adjusted movement parameter from the first preliminary parameter corresponding to the first time interval.

\* \* \* \* \*